April 4, 1961  N. V. BEAMAN ET AL  2,978,096
BOWL STORAGE CONVEYOR
Filed April 10, 1958  2 Sheets-Sheet 1
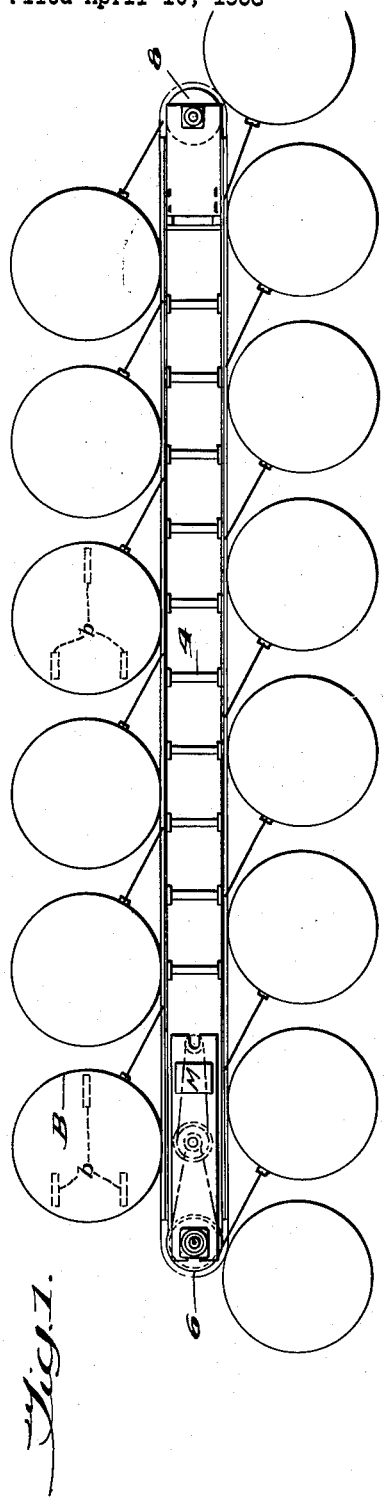
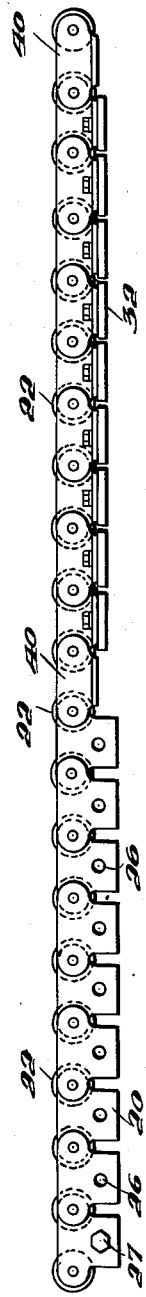
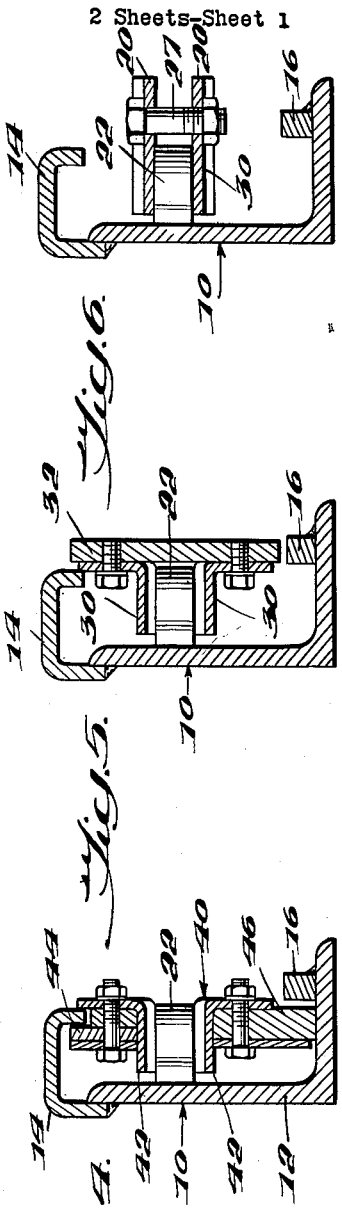
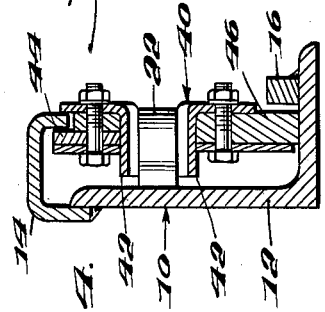
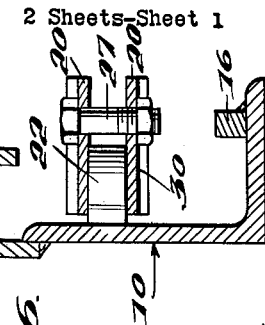
INVENTORS
NORMAN V. BEAMAN,
ROBERT M. BROOMALL,
BY Bailey, Stephens + Huettig
ATTORNEYS

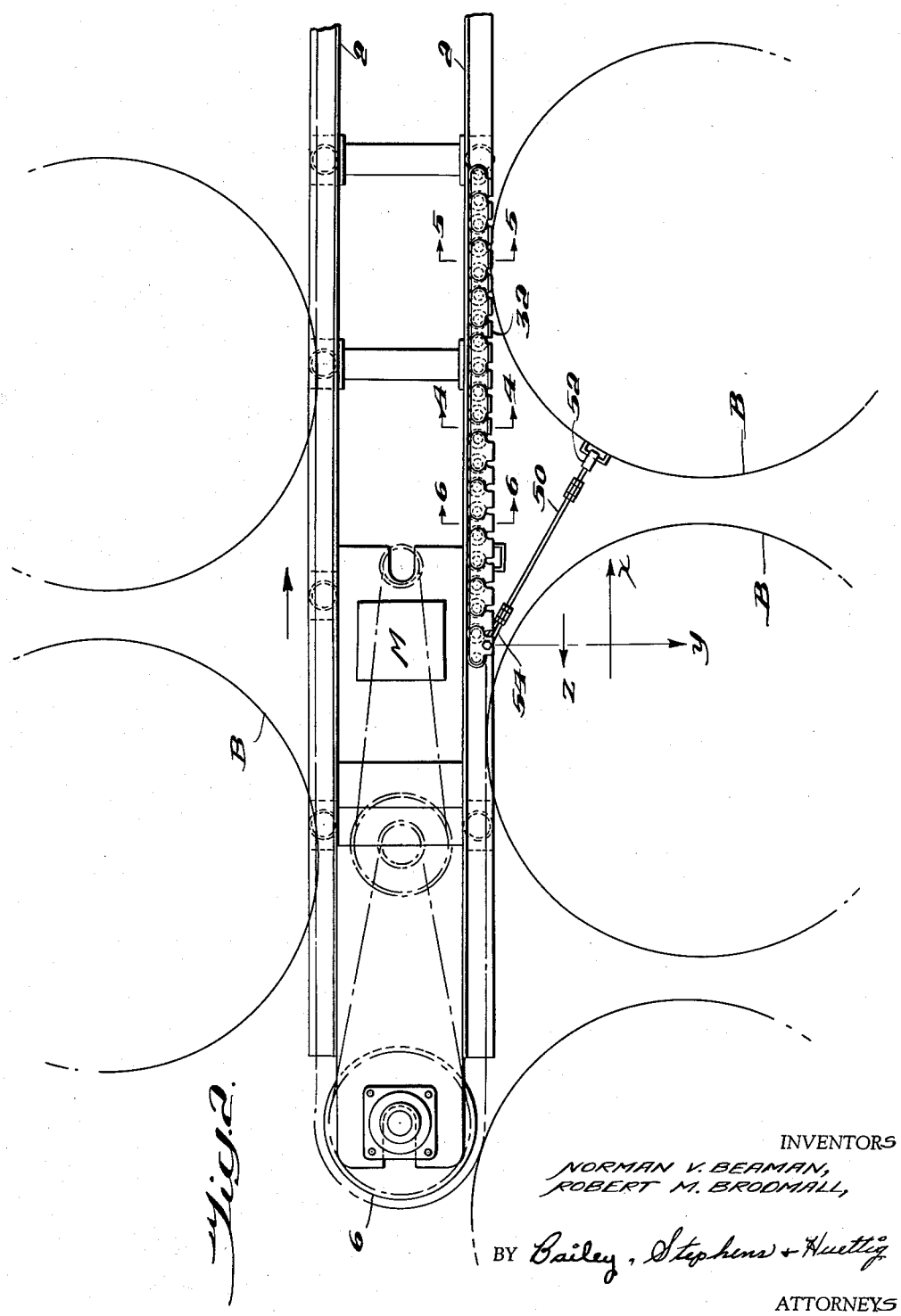

United States Patent Office 2,978,096
Patented Apr. 4, 1961

2,978,096
BOWL STORAGE CONVEYOR

Norman V. Beaman, Cincinnati, Ohio, and Robert M. Broomall, Fort Thomas, Ky., assignors to C. J. Patterson Company, Kansas City, Mo., a corporation of Missouri Filed Apr. 10, 1958, Ser. No. 727,731

12 Claims. (Cl. 198—181)

This invention relates to the storage of tubs or bowls of dough. In particular, the invention is directed to a conveyor for holding bowls of dough in a stored sequential arrangement.

In a commercial bakery, the dough being prepared is allowed to ferment and rise in tubs or bowls, with the fermentation time being from 2 to 3 hours. As the dough ingredients are mixed in each bowl, the bowl is set aside and then pulled out after the fermentation has taken place. After a number of bowls have been prepared, the storing of them so as to conserve floor space presents a problem, together with the necessity of withdrawing the proper bowl in order after its fermentation time. The difficulty lies in that, as the bowls are being moved around while being stored and withdrawn, a bowl may be inadvertently withdrawn before its full fermentation time. These bowls are manually movable in any direction on a plain surfaced floor, as by being mounted upon casters.

The objects of this invention are to produce a device for storing the bowls of dough in their proper sequential order in the minimum of floor space and to arrange that the bowls are taken out of storage in sequence and after the dough is fully fermented.

In general, these objects are obtained by mounting an endless chain on an elongated rack on the floor of the bakery. Motor means is provided for driving the chain at a low speed. Bowls containing dough are attached to the chain by flexible cables, so that they are pulled along by the chain. Consequently, when bowls are attached to the chain at one end of the rack, they will be pulled along in sequence until they have rounded the rack and returned to adjacent their starting point. The time of travel is adjusted to the length of time required for the full fermentation of the dough in the bowls. In order to keep the chain from separating from the rack due to the pull of the cables on the rack, the bowls are arranged so that each succeeding bowl bears against the chain with sufficient pressure to keep the chain from separating from the rack.

The means by which the objects of the invention are obtained are described more fully with respect to the accompanying drawings, in which:

Figure 1 is a diagrammatic plan view of the storage device;

Figure 2 is an enlarged view of a portion of Figure 1;

Figure 3 is a top view of a section of the endless chain;

Figure 4 is a cross-sectional view on the line 4—4 of Figure 2;

Figure 5 is a cross-sectional view on the line 5—5 of Figure 2; and

Figure 6 is a cross-sectional view on the line 6—6 of Figure 2.

As shown in Figures 1 and 2, the elongated rack which is laid horizontally on the bakery floor is composed of a pair of straight parallel rails 2 connected throughout their length by a plurality of crossbeams 4 and closed at their ends by cover plates between which, respectively, are mounted a driving sprocket wheel 6 at one end of the rack and an idler sprocket 8 at the opposite end of the rack. Rails 2 as shown in Figure 4 are composed of a built-up channel 10 composed of a lower angle bar 12 and upper inverted channel member 14 and a guide bar 16 welded to the lower flange of angle 12. Motor M is connected by suitable gearing to sprocket 6.

The endless chain is composed of a series of different type links, as illustrated in Figures 3 to 6. As shown in Figures 3 and 6, the individual links comprising the link plate sections of the chain series are composed of upper and lower plates 20 which are linked together by a link pin which also serves as the axis for a roller 22. Each pair of upper and lower plates has aligned holes 26 in which is fitted a bolt 27 for the purpose of attaching a flexible cable, as will be described hereafter. Plates 20 form a guideway for each cable as it goes around end idler sprocket 8.

A second and bumper plate link section, as seen in Figure 6, is composed of upper and lower plates 30 joined together by a bolt which serves as the axis for rollers 22 similar to those in Figure 3. Plates 30 have vertically extending flanges to which are attached bowl bumper plates 32. The series containing link plates 20 are joined to the section containing bumper plates 32 by the intermediate link 40, shown in Figure 3. This link is composed of a pair of upper and lower plates 42, each having a vertically extending flange and having at the ends of its horizontal flange holes which receive the pins for fastening the link to adjacent links together with the rollers 22. The upper plate 42 has bolted thereto an upper wear strip 44, and a wear strip 46 is likewise bolted to a lower flange of the lower plate. Upper wear strip 44 serves to bear against the downwardly turned flange of the channel section 14 to hold this link against outward movement, while lower wear strip 46 rides on the lower flange of angle 12 and is kept against outward movement by bar 16. These wear strips carry only the weight of the chain.

Each bowl B movable on casters 6, respectively, is attached to the chain by a flexible cable 50. This cable has a hook and eye on opposite ends thereof so that a hook 52 is fastened to a handle on a bowl while the eye 54 is engaged with the bolt 27 in plates 20. The pulling of the weight of the bowl by the chain through the cable causes the cable to assume an angle, or be inclined to, the longitudinal length, or reach, of the chain. However, the link of the chain section to which cable 50 is connected is not restrained against outward movement from the channel 10 intermediate the connecting links 40, and therefor it is necessary to provide some means for maintaining the chain in place. From the vectors $x$ and $y$ for the forces on the link pulled by cable 50 and shown in Figure 2, it is apparent that, when the chain is moving in the direction Z, the link tends to be pulled outwardly by vector $y$. However, the pull on cable 50 produces a vector opposite to vector $y$ and thus causes each bowl B to bear against at least one of the bumper plates 32. Accordingly, the length of the cable 50 is selected so that it can be attached to a bolt 27 as closely as possible to the tangent point of a preceding bowl B bearing against a plate 32. Theoretically, the desired result would best be achieved by having a bowl B pressing on the cable, but experience has shown that the result can be achieved practically by having cable 50 connected to the chain closely to the tangent point. The bowl therefor presses against the chain to counter vector $y$ so that neither the plate links 20 nor the bumper plate 32 sections of the chain separate from their proper position on the rails 2. This is effective along the reach of the rails 2 as the problem does not arise when the bowls travel around sprocket 8. However, the plates 20 form a channel way around each socket in which the chain is confined so that it cannot jump out of the plane of the rails 2 and cut across the sprocket.

In operation, the first bowl B is attached to the chain at the end of the rack adjacent sprocket 6. The motor M is then started which drives the chain to pull the bowl along. After the bowl has moved the appropriate distance, a second bowl is attached to the chain. At this time, the motor can be either stopped or the motor left running as the chain moves at a very slow speed. Successive bowls which roll on casters are attached in turn and are pulled by the chain around sprocket 8 and back to the starting point. A limit switch preferably is mounted adjacent sprocket 6 so that as the leading bowl approaches this sprocket the motor is stopped so that the bowl can be removed from the chain. As each bowl assists in keeping the chain in the rails, the construction of the device is simplified in that guiding means are only used for the connecting links 40, while the other chain links can be those of standard construction.

The advantage of this device is in that, by means of a simple relatively inexpensive construction requiring a minimum of floor space, the bowls of dough are stored and moved in sequence so that each one is ready for delivery at the end of the required fermentation time for the dough contained in the bowl.

Having now described the means by which the objects of the invention are obtained, we claim:

1. A storage conveyor for dough bowls comprising a horizontal elongated rack positioned horizontally on the floor, an endless chain guidably mounted around the outer periphery of said rack, motor means connected to said chain for moving the same about said rack, and flexible cable means connecting bowls to said chain substantially horizontally outwardly of said rack for pulling the bowls around the rack while bearing against said chain.

2. A storage conveyor as in claim 1, said chain comprising link plate sections alternated with bowl bumper plate sections, and each of said cables being connected to a link plate section.

3. A storage conveyor as in claim 2, each of said cables being inclined to the reach of said chain so that each bowl is pulled into contact with a bumper plate bowl section within from two to four chain link sections from an adjacent cable attached to a link plate section.

4. A storage conveyor as in claim 3, further comprising guiding links connecting the link plate sections to the bowl bumper plate sections.

5. A storage conveyor as in claim 4, said rack comprising a pair of channel-shaped rails supporting said chain, and each guiding link having upper and lower bearing blocks slidably engaging the rails.

6. A storage conveyor for dough bowls freely movable in any horizontal direction on a floor comprising an elongated rack adapted to be laid flatly on a floor, sprockets joined to said rack and forming the two opposite ends thereof, channel-shaped rails with horizontal flanges forming the longitudinal sides of said rack between said sprockets, an endless chain extending around said sprockets and slidable in said rails, motor means connected to said chain for moving the same about said rack, and flexible cable means having one end attached to said chain with the other end trailing outwardly at an angle and being fastened to a bowl for pulling said bowl so that the bowl swings inwardly against the chain to prevent the chain from moving outwardly of the rail at the point of contact of the bowl and chain.

7. A storage conveyor as in claim 6, said rails each having a vertical web between said horizontal flanges, and said chain being movably engaged with the surface of said web.

8. A storage conveyor as in claim 7, further comprising rollers secured to said chain and bearing upon said web surface.

9. A storage conveyor as in claim 8, said chain comprising link plate sections alternated with bumper plate sections, and means for removably attaching each chain to a link plate section.

10. A storage conveyor as in claim 9, each link plate section comprising a plurality of spaced horizontal plates separating said rollers and forming a channel way for confining said cables to the plane of said rails as the chain turns about a sprocket.

11. Apparatus for storing dough, said apparatus comprising a plurality of bowl members, ground engaging roller means secured to each of said bowl members, whereby each of said members is freely movable in any horizontal direction, cable attaching means mounted upon each of said members, an elongated rack positioned horizontally on a floor, an endless chain guidably mounted about the periphery of said rack, motor means connected to said chain for moving the same about said rack, a plurality of flexible cables, means securing one end of each of said flexible cables to said chain, the points of attachment of said cables to said chain being spaced from one another a distance greater than the diameter of said members, and means securing the opposite end of each of said cables to the cable attaching means of one of said members, each of said members abutting the chain and preventing outward movement of said chain away from said rack.

12. Apparatus for storing dough, said apparatus comprising a plurality of bowl members, ground engaging roller means secured to each of said bowl members, whereby each of said members is freely movable in any horizontal direction, cable attaching means mounted upon each of said members, an elongated rack positioned horizontally on a floor, an endless chain guidably mounted about the periphery of said rack, motor means connected to said chain for moving the same about said rack, a plurality of flexible cables, means securing one end of each of said flexible cables to said chain, the points of attachment of said cables to said chain being spaced from one another a distance greater than the diameter of said members, and means securing the opposite end of each of said cables to the cable attaching means of one of said members, the lengths of said cables and the diameters of said members being related so that each member abuts the chain closely adjacent to the point of attachment of the cable secured to the next succeeding member, each of said members abutting the chain and preventing outward movement of said chain away from said rack.

References Cited in the file of this patent
UNITED STATES PATENTS 2,266,786    Mitchell _____ Dec. 23, 1941

FOREIGN PATENTS 260,099    Germany _____ May 19, 1913